United States Patent
Lee et al.

(10) Patent No.: US 7,848,616 B2
(45) Date of Patent: Dec. 7, 2010

(54) PROCESSING DEVICE AND METHOD FOR TIME DOMAIN CHANGE OF A/V DATA STREAM

(75) Inventors: Scot Lee, Hsin-Tien (TW); Willy Chuang, Hsin-Tien (TW)

(73) Assignee: Via Technologies, Inc., Taipei County (TW)

( * ) Notice: Subject to any disclaimer, the term of this patent is extended or adjusted under 35 U.S.C. 154(b) by 1770 days.

(21) Appl. No.: 10/995,288

(22) Filed: Nov. 24, 2004

(65) Prior Publication Data

US 2006/0088273 A1    Apr. 27, 2006

(30) Foreign Application Priority Data

Oct. 21, 2004    (TW) ............................... 93131992 A

(51) Int. Cl.
*H04N 7/26*    (2006.01)
(52) U.S. Cl. .................... 386/124; 386/125; 386/83; 386/109
(58) Field of Classification Search ......... 386/124–125, 386/83, 109, 348
See application file for complete search history.

(56) References Cited

U.S. PATENT DOCUMENTS

| 5,923,869 | A  | * | 7/1999 | Kashiwagi et al. | ........... | 713/501 |
| 6,795,641 | B2 | * | 9/2004 | Okada et al. | .................. | 386/95 |
| 2004/0179820 | A1 | * | 9/2004 | Kashiwagi et al. | ............ | 386/95 |

* cited by examiner

*Primary Examiner*—Thai Tran
*Assistant Examiner*—Helen Shibru
(74) *Attorney, Agent, or Firm*—Thomas, Kayden, Horstemeyer & Risley, LLP

(57) ABSTRACT

A processing device and method for time domain change of A/V data stream comprises a starting threshold setting unit for setting a starting threshold; a detecting module for detecting whether the A/V data stream having a SCR domain change; a counting unit comprising a counter for recording a continuous probable times of the SCR domain change according a detecting result of the detecting module; a comparing unit for comparing the counter with the starting threshold; and a time domain change procedure performing unit for performing a time domain change procedure of the A/V data stream for synchronization of a STC according a detecting result of the comparing unit. Accordingly, since the frequency of the time domain change will be lower, the corresponding response of the decoder will be in time for playing as well.

7 Claims, 5 Drawing Sheets

PROCESSING DEVICE AND METHOD FOR TIME DOMAIN CHANGE OF A/V DATA STREAM

BACKGROUND OF THE INVENTION

1. Field of Invention

The invention relates to a processing device and method for time domain change of audio and video (A/V) data stream and, in particular, to the processing device and method for performing the time domain change procedure according to the detection of continuous probable times of the SCR domain change.

2. Related Art

There are several A/V compression techniques such as MPEG standard that widely applied for the digital TV and the multimedia applications. The NPEG technique transforms the dynamic A/V data into standard MPEG A/V data stream. That is, the A/V data is recorded in digital format in the storage such as a digital versatile disc (DVD).

The system clock reference (SCR) and the presentation time stamp (PTS) will be add to the packs of the MPEG A/V data stream during the MPEG encoding, and the SCR and the PTS increasing in a fixed rate after the SCR first updated the system time clock (STC). However, when a program is composed by editing and rearranging, the SCR and the PTS will vary such as increasing or decreasing with large amounts suddenly. Since the decoder compares the SCR and the PTS for determining the playing time, and supposes that the STC doesn't change followed the SCR and the PTS varied, the decoder will refer to an old STC and result in the STC asynchronization problem in playing.

In practice, The E-STD model is proposed for solving the STC asynchronization problem. With refer to the FIG. 1, a decoder 10' decodes many packs of the A/V data stream and outputs a first A/V data, many second A/V data, a first PTS, many second PTS, a first SCR, and many second SCR. A STC counter 14' initials the first STC with the first SCR such as to the first STC increasing in the fixed rate. An audio data register 16' and a video data register 18' temporarily store the first audio data and the first video data transmitted by the decoder 10' respectively. An audio decoder 20' and a video decoder 22' decodes the first audio data and the first video data respectively for generating a first decoded audio data and the first decoded video data during playing. A playing unit 24' compares the first PTS with the first STC of the first decoded audio data and the first decoded video data, and plays the first decoded audio data and the first decoded video data if the first PTS is equal to the first STC.

The decoder 10' will send the notice to the audio decoder 20' and the video decoder 22' when a domain change of the second SCR happened and detected by the decoder 10'. However, since the data consuming rate of each decoder may not equal to others, the video decoder 22' probably received the notice later than the audio decoder 20', and when the audio decoder 20' starts to consume the data of the second SCR, the video decoder 22' still consuming the data of the first SCR at the same time. The decoder 10' therefore sends the second SCR to a subtractor 12' for calculating the difference of the second SCR and the first SCR, and the subtractor 12' further generating a second STC through subtracting the difference from the first STC. Hence, a STC counter 14' receives and forwards the second STC to the audio decoder 20' for synchronizing the audio decoder 20' and the video decoder 22'.

Although the E-STD model can be employed as a solution of STC synchronization problem, the decoder may response too late while the SCR domain change happened frequently. For example, time of the SCR domain change is restricted between two video object units (VOUBs) for DVD, or the decoder may response too late while the SCR and the PTS increasing or decreasing with large amounts suddenly and the SCR domain change happened frequently. In addition, the scrape on the disc will result in the faults in referring to the SCR of the A/V data stream.

SUMMARY OF THE INVENTION

In view of the foregoing, the invention is to provide a processing method for time domain change of an A/V data stream. The method of the invention comprises the steps of setting a starting threshold for determining a performing time of a time domain change procedure of the A/V data stream; detecting sequentially whether the A/V data stream having a SCR domain change; providing and initialing a counter for recording a continuous probable times of the SCR domain change; and comparing the counter with the starting threshold, and performing the time domain change procedure of the A/V data stream for synchronization of a STC while the counter is equal to the starting threshold.

In addition, the invention provides a processing device for time domain change of an A/V data stream, which comprises a starting threshold setting unit for setting a starting threshold; a detecting module for detecting whether the A/V data stream having a SCR domain change; a counting unit comprising a counter for recording a continuous probable times of the SCR domain change according a detecting result of the detecting module; a comparing unit for comparing the counter with the starting threshold; and a time domain change procedure performing unit for performing a time domain change procedure of the A/V data stream for synchronization of a STC according a comparing result of the comparing unit. Herein, the processing device can be applied for a multimedia computer system or a digital versatile disk (DVD) playing system.

As mentioned above, the processing method and device for time domain change of an A/V data stream of the invention can lower the frequency of the time domain change, diminish the condition of the decoder in response to the time domain change too late for playing, and hence rise the playing quality of the A/V data.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

Figure 1:
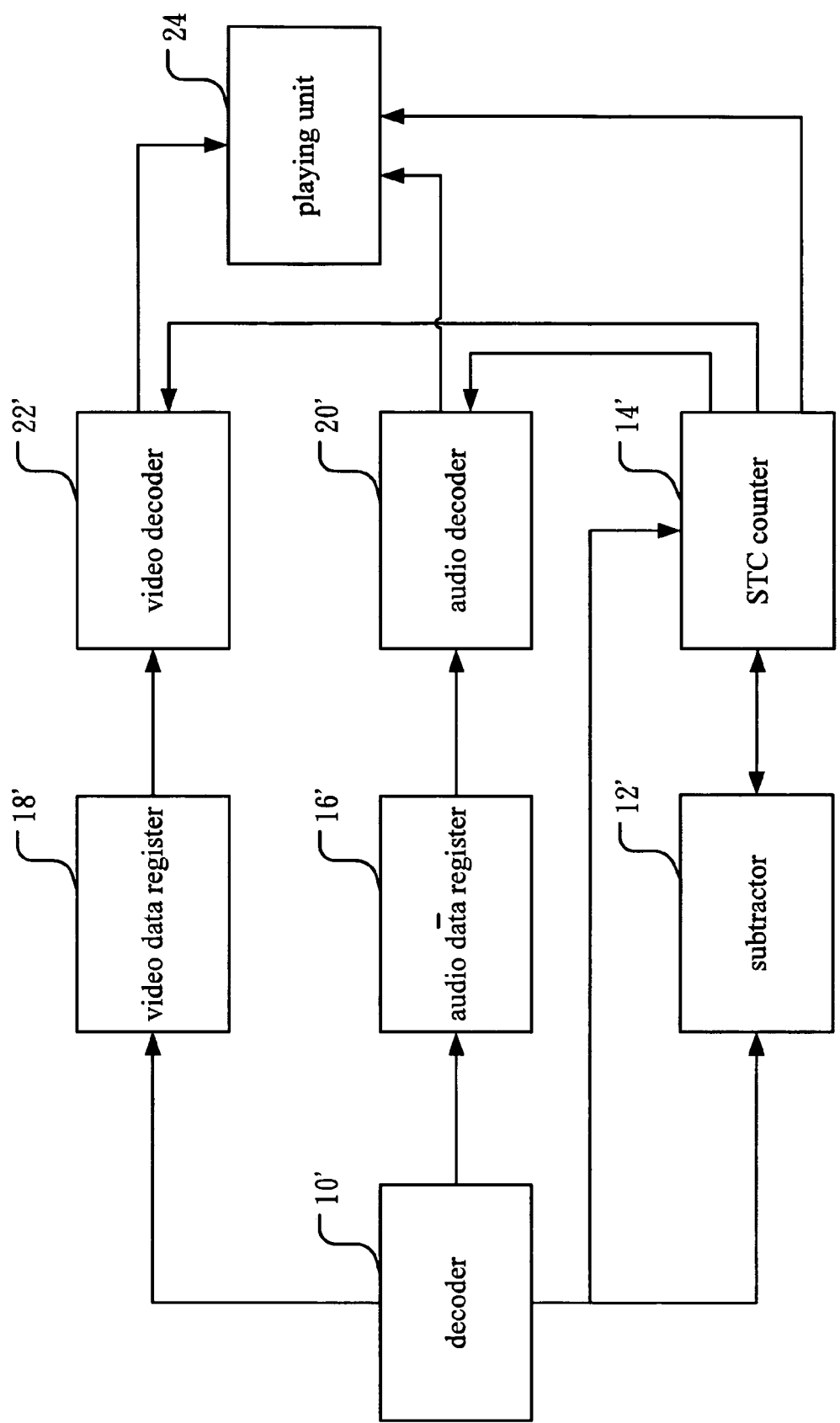
FIG. 1 is a block diagram of A/V data synchronization in the MPEG system of the related art.
Figure 2:
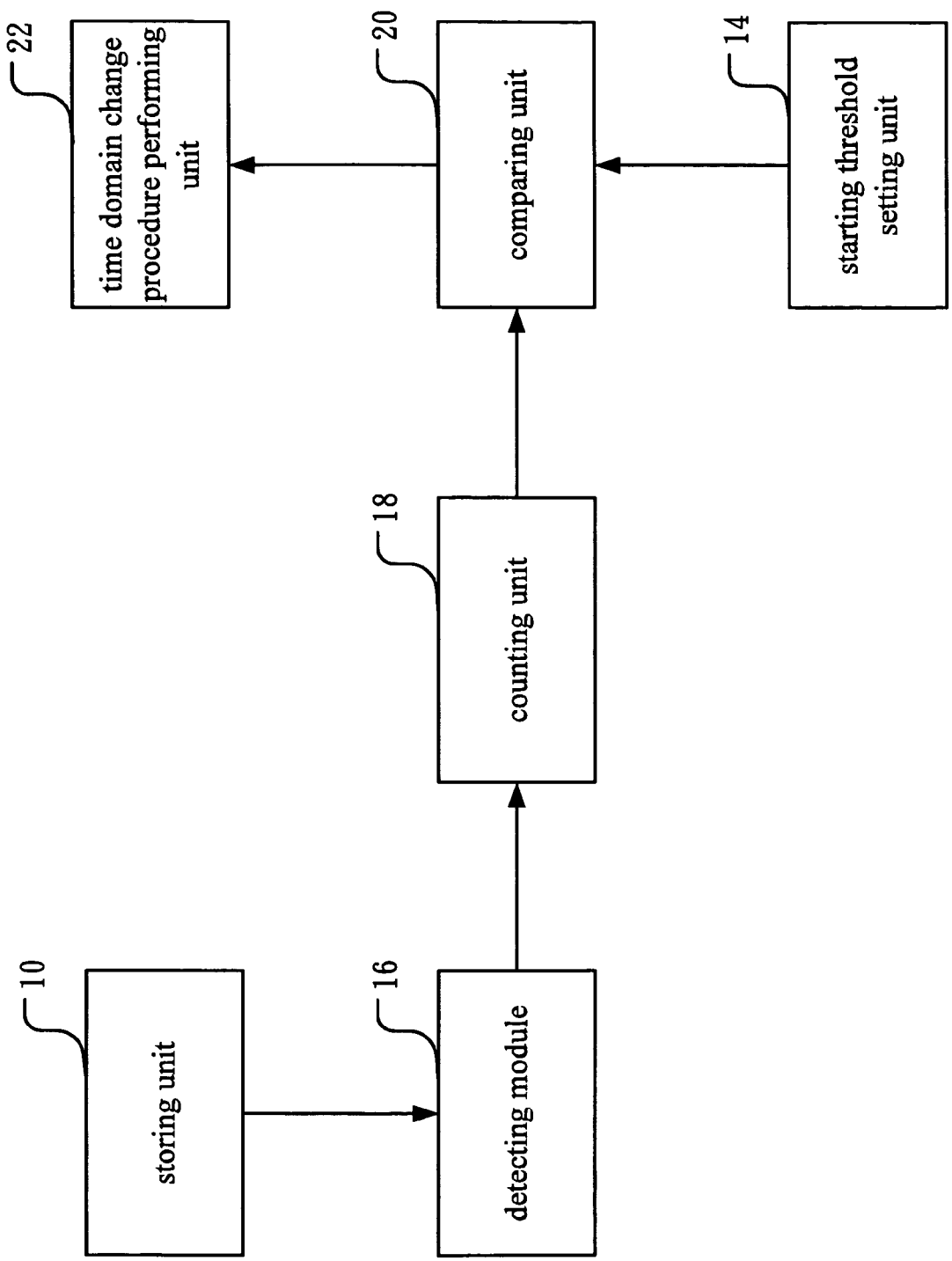
FIG. 2 is a block diagram of the processing device for time domain change of A/V data stream according to an embodiment of the invention.

FIG. 2 is a block diagram of the processing device for time domain change of A/V data stream according to an embodiment of the invention. In the embodiment, the processing device comprises a storing unit 10 for providing the A/V data stream which comprises a plurality of packs; a starting threshold setting unit 14 for setting a starting threshold; a detecting module 16 for detecting whether the A/V data stream having a SCR domain change; a counting unit 18 comprising a counter for recording a continuous probable times of the SCR domain change according a detecting result of the detecting module 16; a comparing unit 20 for comparing the counter with the starting threshold; and a time domain change procedure performing unit 22 for performing a time domain change procedure of the A/V data stream for synchronization of a STC according a comparing result of the comparing unit. Moreover, the time domain change procedure of the A/V data stream is an E-STD model in this embodiment, and hence the time domain change procedure performing unit 22 determines the performing time of the time domain change procedure of the A/V data stream according to the comparing result of the counter and the starting threshold.

Figure 3:
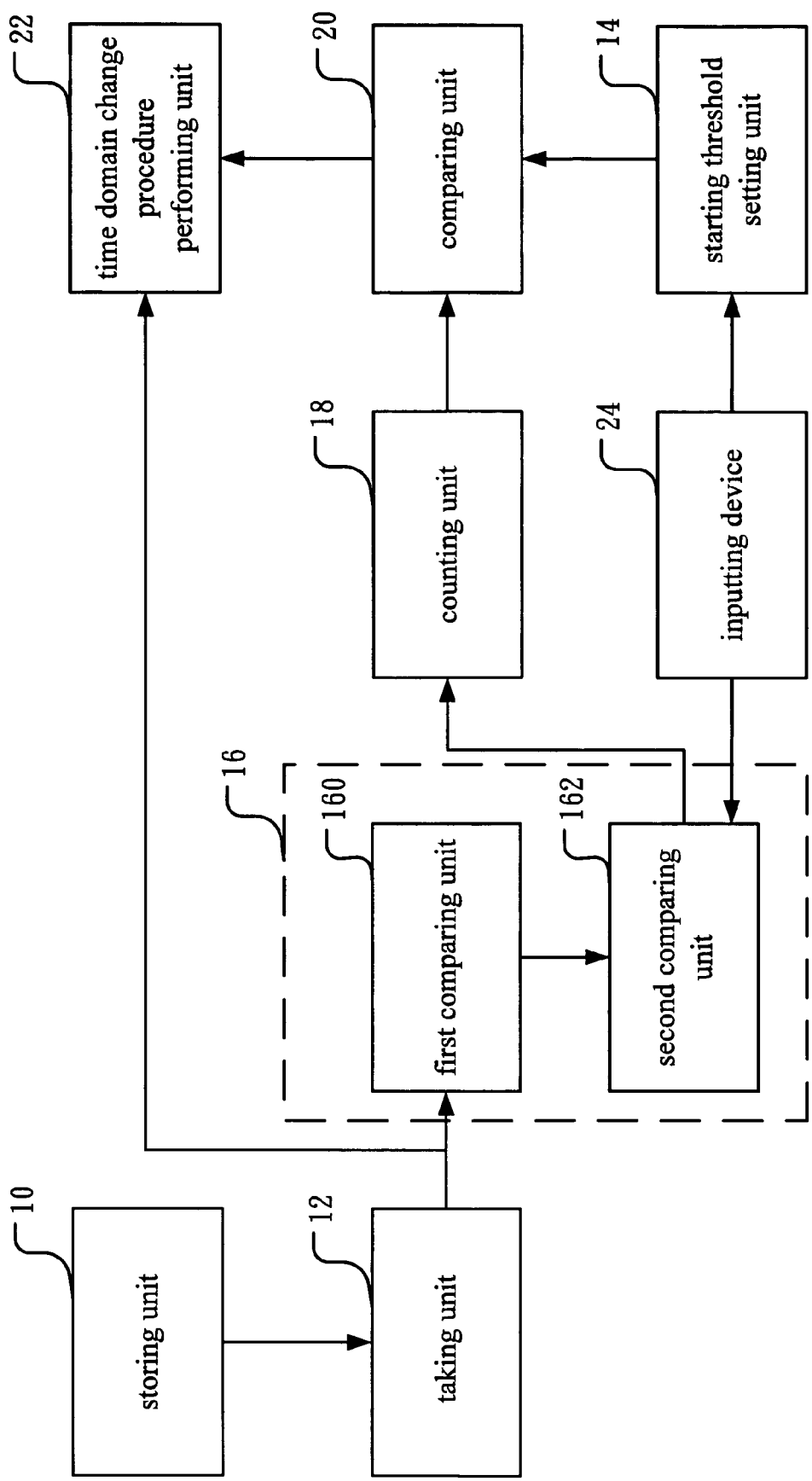
FIG. 3 is a block diagram of the processing device for time domain change of A/V data stream according to another embodiment of the invention.

With reference to FIG. 3, a processing device for time domain change of A/V data stream according to another embodiment of the invention comprises a storing unit 10 for providing the A/V data stream which comprises a plurality of packs; a taking unit 12 for taking a SCR of the plurality of packs for judging the SCR domain change of the A/V data stream; a starting threshold setting unit 14 for setting a starting threshold; a detecting module 16 includes a first comparing unit 160 for comparing the SCR of the plurality of packs sequentially for generating many differences, and a second comparing unit 162 for comparing the differences with a difference threshold; a counting unit 18 includes a counter for recording a continuous probable times of the SCR domain change according a detecting result of the detecting module 16, and re-initialing the counter if the counter is equal to the starting threshold; and a time domain change procedure performing unit 22 for performing a time domain change procedure of the A/V data stream for synchronization of a STC according a comparing result of the comparing unit. In addition, the device further includes an inputting device 24 such as a remote controller or a panel for providing an external command for adjusting the starting threshold and the difference threshold.

Figure 4:
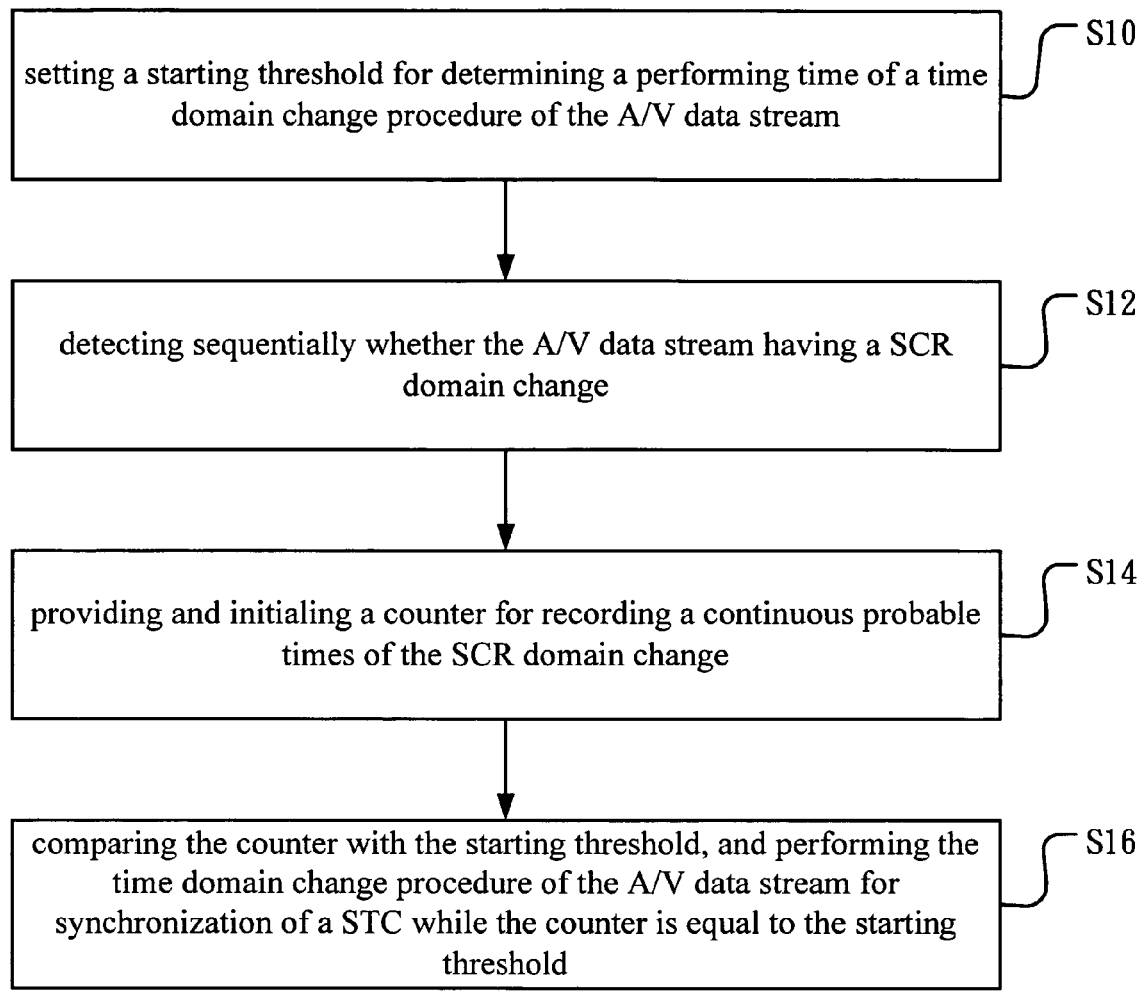
FIG. 4 is a flow chart of the processing method for time domain change of A/V data stream of the invention.

FIG. 4 is a flow chart of the processing method for time domain change of A/V data stream of the invention. The processing method comprises the following steps of setting a starting threshold for determining a performing time of a time domain change procedure of the A/V data stream (step S10); detecting sequentially whether the A/V data stream having a SCR domain change (step S12); providing and initialing a counter for recording a continuous probable times of the SCR domain change (step S14); and comparing the counter with the starting threshold, and performing the time domain change procedure of the A/V data stream for synchronization of a STC while the counter is equal to the starting threshold (step S16).

In the embodiment, the processing method further includes the step of providing the A/V data stream having many packs, and taking the SCR of packs for detection step S12. Besides, the step S12 may include the steps of comparing a SCR of a first pack of the A/V data stream with a SCR of a second pack of the A/V data stream; forward the result of comparing to the step S14 for accumulating the counter while the a difference of the SCR of the first pack and the SCR of the second pack is greater than a difference threshold.

Figure 5:
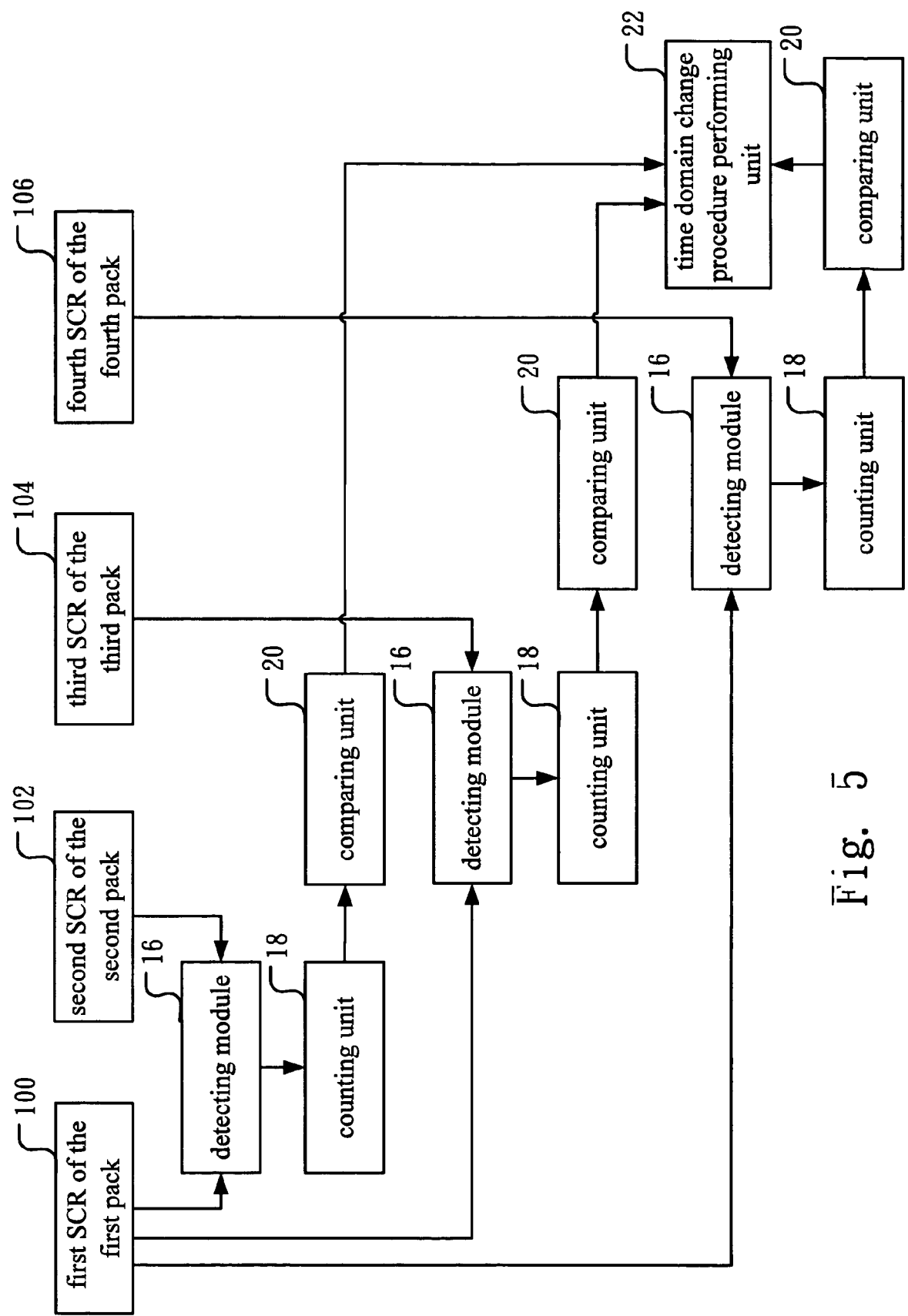
FIG. 5 is a schematic view showing the counter for recording the continuous probable times of the SCR domain change of the invention.

FIG. 5 is a schematic view showing the counter for recording the continuous probable times of the SCR domain change of the invention. The storing unit 10 provides the A/V data stream comprising a first SCR 100 of the first pack, a second SCR 102 of the second pack, a third SCR 104 of the third pack, and a fourth SCR 106 of the fourth pack. In this case, supposes that the starting threshold is three, and the counter is zero, the detecting module 16 compares the first SCR 100 and the second SCR 102 for generating a first difference, the first difference compares with a difference threshold, and then the counting unit 18 accumulates the counter if the first difference is larger than the difference threshold, and thus the comparing unit 20 compares the counter with the starting threshold. Since the current counter is not equal to the starting threshold, the time domain change procedure performing unit 22 will not perform the time domain change procedure of the A/V data stream. Similarly, the detecting module 16 compares the first SCR 100 and the third SCR 104 and the fourth SCR 106 respectively for generating a second difference and a fourth difference, accumulates the counter since the second difference is larger than the difference threshold, and compares the current counter with the starting threshold such as to the time domain change procedure performing unit 22 will not perform the time domain change procedure of the A/V data stream. Hence, accumulating the counter since the third difference is larger than the difference threshold, and the counter is equal to the starting threshold such as to the time domain change procedure performing unit 22 will take the fourth SCR 106 of the fourth pack and perform the time domain change procedure of the A/V data stream for synchronizing the STC. Furthermore, the countering unit 18 re-initials the counter for re-counting and recording the continuous probable times of the SCR domain change while the counter is equal to the starting threshold.

The processing device and method for time domain change of A/V data stream can be completed by performing the firmware or implementing the logic circuit.

In summary, the processing device and method for time domain change of A/V data stream of the invention records the continuous probable times of the SCR domain change in a counting unit with a counter, compares the counter with the starting threshold, and performs the time domain change procedure of the A/V data stream while the counter is equal to starting threshold such as to reduce times of performing the time domain change procedure and solve the response problem of the decoder resulted from the SCR incorrect and transforms frequently.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A processing method for time domain change of an A/V data stream, comprising:

setting a starting threshold for determining a performing time of a time domain change procedure of the A/V data stream;

detecting sequentially whether the A/V data stream having a SCR domain change;

providing and initialing a counter for recording a continuous probable times of the SCR domain change; and comparing the counter with the starting threshold, and performing the time domain change procedure of the A/V data stream for synchronization of a STC while the counter is equal to the starting threshold.

2. The method of claim 1, further comprising:
comparing a SCR of a first pack of the A/V data stream with a SCR of a second pack of the A/V data stream; and
accumulating the counter while a difference of the SCR of the first pack and the SCR of the second pack is greater than a difference threshold.

3. The method of claim 2, further comprising:
taking the SCR of the second pack for synchronization of the STC while the counter is equal to the starting threshold.

4. The method of claim 2, further comprising:
providing an external command for adjusting the difference threshold.

5. The method of claim 1, wherein the time domain change procedure of the A/V data stream is an E-STD model.

6. The method of claim 1, further comprising:
re-initialing the counter if the counter is equal to the starting threshold.

7. The method of claim 1, further comprising:
providing an external command for adjusting the starting threshold.

* * * * *